United States Patent
Johnson

(10) Patent No.: US 9,807,925 B2
(45) Date of Patent: Nov. 7, 2017

(54) ROBOTIC MOWER AREA COVERAGE SYSTEM

(75) Inventor: David A. Johnson, Charlotte, NC (US)

(73) Assignee: Deere & Company, Moline, IL (US)

(*) Notice: Subject to any disclaimer, the term of this patent is extended or adjusted under 35 U.S.C. 154(b) by 773 days.

(21) Appl. No.: 12/845,274

(22) Filed: Jul. 28, 2010

(65) Prior Publication Data
US 2012/0029755 A1 Feb. 2, 2012

(51) Int. Cl.
G05D 1/02 (2006.01)
A01D 34/00 (2006.01)
G05D 1/00 (2006.01)
G06F 19/00 (2011.01)

(52) U.S. Cl.
CPC ......... *A01D 34/008* (2013.01); *G05D 1/0219* (2013.01); *G05D 1/0265* (2013.01); *G05D 2201/0208* (2013.01)

(58) Field of Classification Search
CPC .. A01D 34/008; A01D 34/74; A01D 2101/00; A01D 34/83; B60L 2200/40; B60L 15/20; B60L 2220/46; B60L 2240/32; B60L 2240/62; G05D 2201/0208; G05D 1/0265; G05D 1/0272; G05D 1/028; G05D 1/0227; G05D 1/0255; G05D 1/0044; G05D 1/0088; G05D 1/021; Y10S 901/01; Y10S 56/15; Y10S 901/09
See application file for complete search history.

(56) References Cited

U.S. PATENT DOCUMENTS

| | | | |
|---|---|---|---|
| 4,694,639 A * | 9/1987 | Chen | A01D 34/008 250/202 |
| 4,887,415 A * | 12/1989 | Martin | 56/10.2 R |
| 5,007,234 A * | 4/1991 | Shurman | A01D 34/008 180/401 |
| 5,444,965 A * | 8/1995 | Colens | A01D 34/008 56/10.2 A |
| 5,507,137 A | 4/1996 | Norris | |
| 5,528,888 A * | 6/1996 | Miyamoto | A01B 69/008 56/10.2 F |
| 6,088,644 A * | 7/2000 | Brandt | E01C 19/004 172/4.5 |
| 6,112,143 A * | 8/2000 | Allen | E01C 19/006 342/357.32 |

(Continued)

FOREIGN PATENT DOCUMENTS

| | | |
|---|---|---|
| EP | 1647175 | 4/2006 |
| WO | 94/08280 | 4/1994 |

OTHER PUBLICATIONS

KA LawnBott. Product Brochure. Kyodo America, KA Home Robotics. Lawrenceville, GA. <URL:http://www.lawnbott.com/>.

*Primary Examiner* — Ryan Zeender
*Assistant Examiner* — Dana Amsdell

(57) ABSTRACT

A robotic mower area coverage system includes a load sensor on the robotic mower signaling load on a cutting blade motor, a boundary sensor on the robotic mower indicating the distance from the sensor to a boundary wire, a timer on the robotic mower indicating when the robotic mower last used a specified boundary coverage, and a vehicle control unit on the robotic mower selecting the type of area coverage based on input from the load sensor, the boundary sensor and the timer, and commanding a pair of traction drive motors to drive the robotic mower using the selected type of area coverage.

10 Claims, 10 Drawing Sheets

(56) References Cited

U.S. PATENT DOCUMENTS

| | | | | |
|---|---|---|---|---|
| 6,255,793 B1* | 7/2001 | Peless | A01D 34/008 180/168 |
| 6,262,738 B1* | 7/2001 | Gibson | G06T 15/06 345/419 |
| 6,321,515 B1* | 11/2001 | Colens | A01D 34/008 56/10.2 A |
| 6,459,955 B1* | 10/2002 | Bartsch | A47L 9/00 318/568.11 |
| 6,574,536 B1* | 6/2003 | Kawagoe | G05D 1/0033 15/319 |
| 6,809,490 B2* | 10/2004 | Jones et al. | 318/568.12 |
| 7,117,660 B1* | 10/2006 | Colens | 56/10.2 A |
| 7,173,391 B2 | 2/2007 | Jones et al. | |
| 7,206,677 B2 | 4/2007 | Hulden | |
| 7,349,759 B2* | 3/2008 | Peless et al. | 700/245 |
| 7,388,343 B2 | 6/2008 | Jones et al. | |
| 7,429,843 B2 | 9/2008 | Jones et al. | |
| 7,613,552 B2 | 11/2009 | Bernini | |
| 7,663,333 B2 | 2/2010 | Jones et al. | |
| 7,873,437 B2* | 1/2011 | Aldred | G05D 1/0227 700/245 |
| 8,090,537 B2* | 1/2012 | Nishira | G05D 1/0214 340/436 |
| 8,103,383 B2* | 1/2012 | Nakamura | B25J 9/1676 318/568.12 |
| 8,285,460 B2* | 10/2012 | Hoffman | A01B 79/005 239/1 |
| 8,295,979 B2* | 10/2012 | Thacher | A01B 79/005 318/568.1 |
| 9,471,063 B2* | 10/2016 | Ouyang | G05D 1/0265 |
| 2003/0025472 A1* | 2/2003 | Jones et al. | 318/568.12 |
| 2006/0173577 A1* | 8/2006 | Takeda | G06T 7/20 700/245 |
| 2007/0276558 A1* | 11/2007 | Kim | G01S 13/825 701/23 |
| 2008/0027590 A1* | 1/2008 | Phillips | G05D 1/0088 701/2 |
| 2008/0039974 A1* | 2/2008 | Sandin | G05D 1/028 700/258 |
| 2008/0086241 A1* | 4/2008 | Phillips | G05D 1/0038 701/2 |
| 2008/0183349 A1* | 7/2008 | Abramson | A01D 34/008 701/23 |
| 2009/0055022 A1* | 2/2009 | Casey et al. | 700/258 |
| 2009/0118890 A1* | 5/2009 | Lin | G05D 1/0246 701/28 |
| 2009/0281661 A1* | 11/2009 | Dooley et al. | 700/258 |
| 2010/0108098 A1* | 5/2010 | Splinter | A47L 9/06 134/21 |
| 2010/0286825 A1* | 11/2010 | Rew | A47L 9/009 700/253 |
| 2011/0153172 A1* | 6/2011 | Anderson | A01B 69/008 701/50 |
| 2011/0202224 A1* | 8/2011 | Thompson | G05D 1/0227 701/26 |
| 2012/0029752 A1* | 2/2012 | Johnson | A01D 34/008 701/23 |
| 2012/0029753 A1* | 2/2012 | Johnson | A01D 34/008 701/23 |
| 2012/0029754 A1* | 2/2012 | Thompson | A01D 34/008 701/23 |
| 2012/0029756 A1* | 2/2012 | Johnson | A01D 34/008 701/26 |
| 2014/0031981 A1* | 1/2014 | Fernando | G05D 1/024 700/253 |

\* cited by examiner

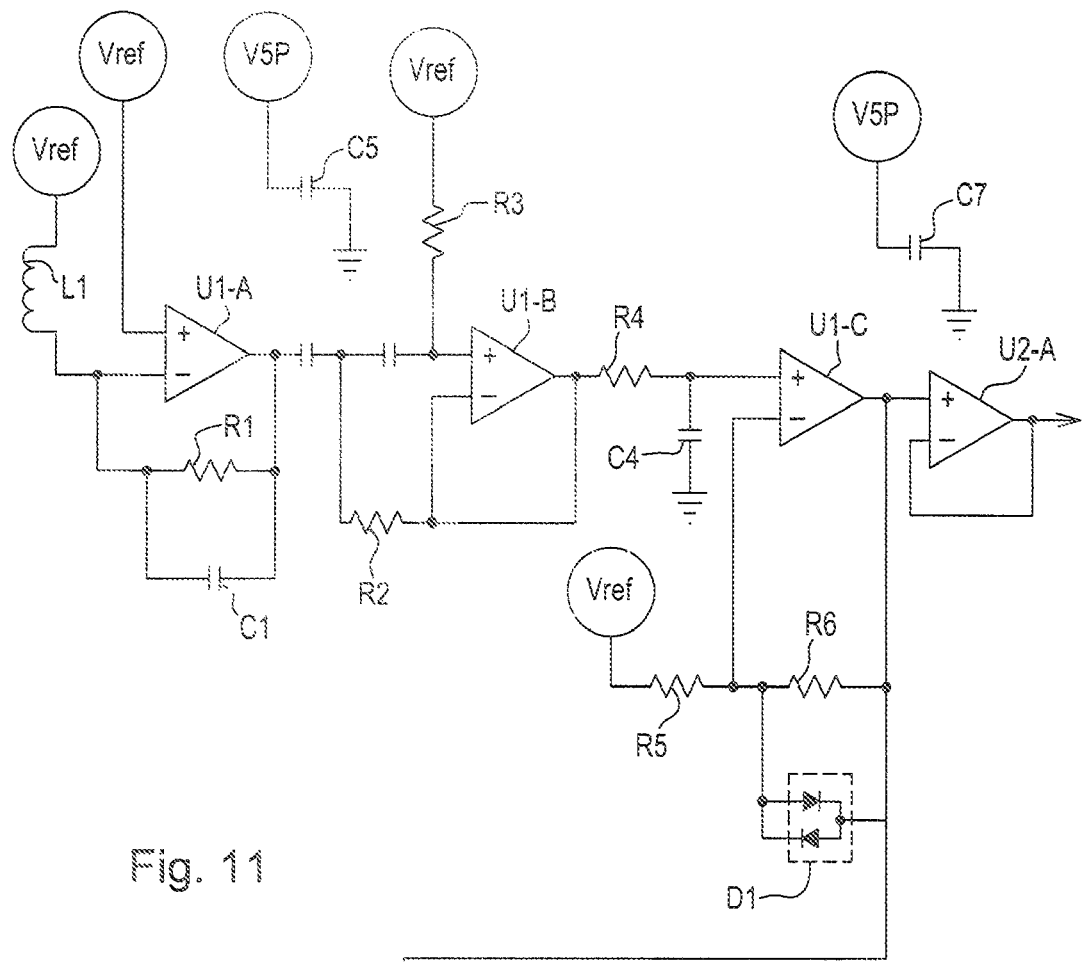
Fig. 11
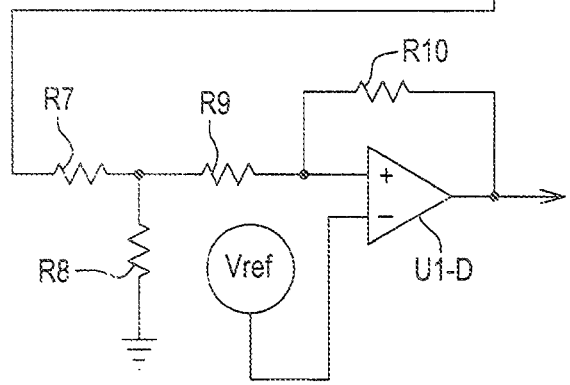

US 9,807,925 B2

ROBOTIC MOWER AREA COVERAGE SYSTEM

FIELD OF THE INVENTION

This invention relates to robotic lawn mowers, and more specifically to an area coverage system for a robotic mower.

BACKGROUND OF THE INVENTION

Robotic mowers may leave uncut areas of grass that human observers can easily detect. This is because a robotic mower's path lets it bounce around the area within the boundary wire and depend on probabilities for convergence of coverage, because the robotic mower's grass length sensors are unable to efficiently find uncut grass, and because the robotic mower must return to the charging station before completely mowing a large area. There is a need for an improved robotic mower area coverage system to achieve more complete coverage and not leave uncut grass within a known or detectable boundary.

SUMMARY OF THE INVENTION

A robotic mower area coverage system including a load sensor on the robotic mower signaling load on a cutting blade motor, a boundary sensor on the robotic mower indicating the distance from the sensor to a boundary wire, a timer on the robotic mower indicating when the robotic mower last used a specified boundary coverage, and a vehicle control unit on the robotic mower selecting the type of area coverage based on input from the load sensor, the boundary sensor and the timer, and commanding a pair of traction drive motors to drive the robotic mower using the selected type of area coverage.

BRIEF DESCRIPTION OF THE DRAWINGS

FIG. 11 is a schematic diagram of a boundary sensor according to a preferred embodiment of the invention.

DESCRIPTION OF THE PREFERRED EMBODIMENT

Figure 1:
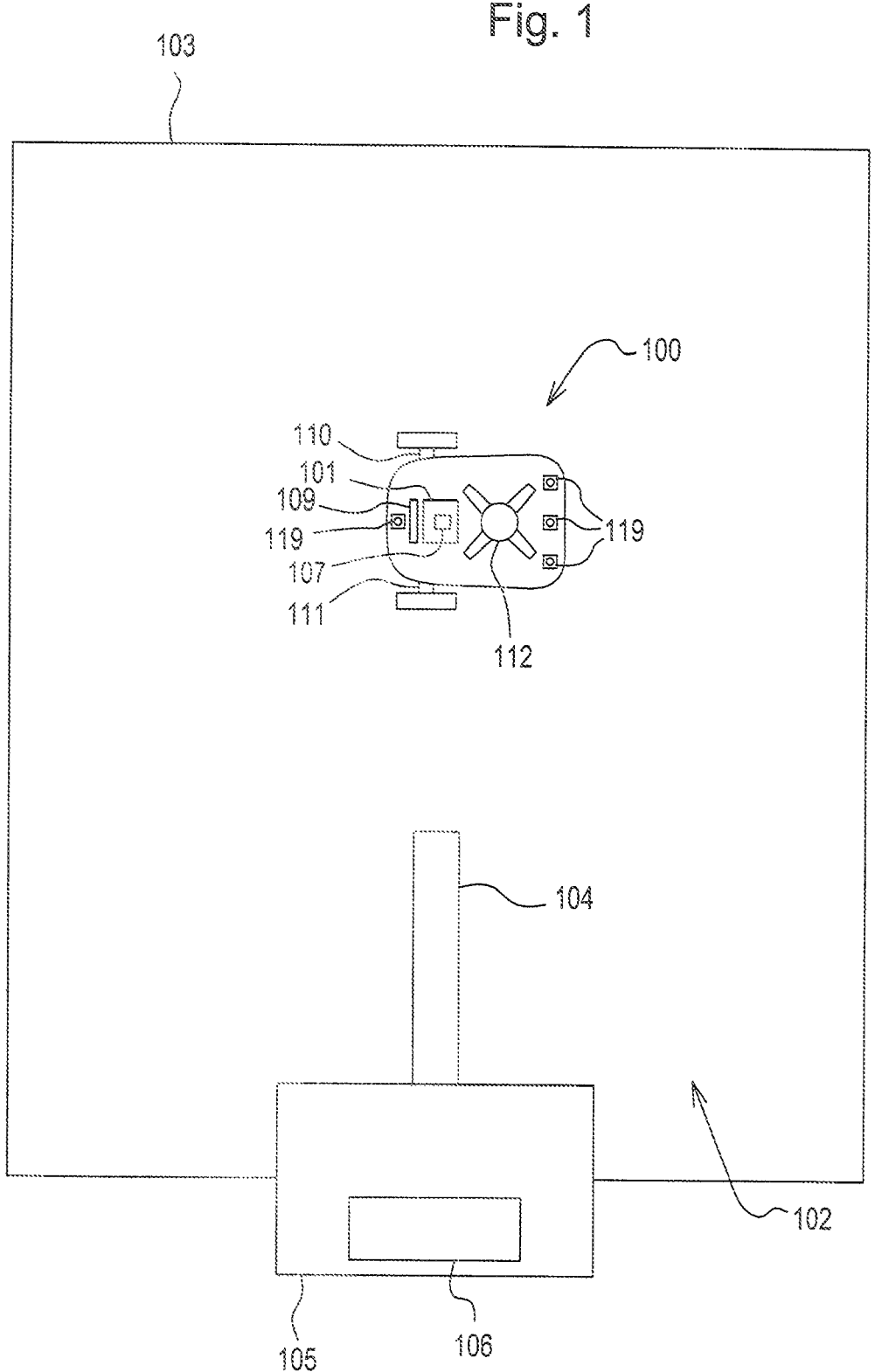
FIG. 1 is schematic drawing of a robotic mower within a main boundary wire according to a preferred embodiment of the invention.

In one embodiment shown in FIG. 1, robotic mower 100 may be powered by battery pack 109 that may be charged periodically at charging station 105. Vehicle control unit 101 may control all of the electronic functions of the robotic mower. For example, vehicle control unit 101 may command a pair of traction motors 110, 111 to turn traction drive wheels, blade motor 112 to rotate a cutting blade or blades, battery pack 109, a user interface and various sensors.

Vehicle control unit 101 may be a printed circuit board assembly that serves as the main control board for the robotic mower. The vehicle control unit may interpret and process information from various sensors, and use that information to control and operate the pair of traction motors to drive the robotic mower over a yard in order to maintain the lawn, and to drive the blade motor. For example, vehicle control unit may be connected to a number of sensors including one or more boundary sensors 119, as well as one or more obstacle sensors or accelerometers. The vehicle control unit also may communicate with the battery pack in order to monitor the status of the battery pack to maintain a charge for one or more lithium ion batteries in the battery pack. The vehicle control unit also may be connected to a user interface module including an LCD display along with several indicator lights and key buttons for operator input.

In one embodiment, the vehicle control unit may include a microcontroller such as an LQFPSTM32F103ZET6 processor from ST Microelectronics. The microcontroller may have 512 kB of internal flash memory and 64 kbytes of internal RAM. The microcontroller may contain an ARM Cortex M3 core, may run at a maximum core clock frequency, and may use an onboard AtoD converter. The vehicle control unit may contain external static random access memory (SRAM) connected to the microcontroller with a 16 bit FSMC bus and have a minimum capacity of 1 Megabit.

In one embodiment, the vehicle control unit may include three external EEPROM integrated circuits. For example, the EEPROMs may each be 125 kilobyte ICs for a total capacity of 384 kilobytes. The EEPROMs may use and SPI interface to the microcontroller and may be used to store configuration data. The vehicle control unit may use the microcontroller's internal real time clock module.

In one embodiment, the vehicle control unit may interface and control a blade motor controller to power and control blade motor 112 that drives the cutting blade on the robotic mower. For example, blade motor 112 may be a permanent magnet brushless DC motor, such as the EBM Papst 63.20 BLDC motor having a typical output shaft speed range of about 4000 rpm. The vehicle control unit may have three inputs which receive signals from hall effect rotor position sensors contained in the blade motor, such as Melexis US 2884 Hall effect sensors. The vehicle control unit may sense the speed of the blade motor using feedback from the Hall effect sensors, and may sense the current through the blade motor phases combined.

In one embodiment, the vehicle control unit may be connected to traction motor controllers for each of the left and right traction motors 110, 111. Each traction motor may be a permanent magnet brushless DC motor, such as a EBM Papst 42.20 BLDC motor having a typical output shaft speed range of about 2080 rpm. The vehicle control unit may have three inputs which receive signals from Hall effect rotor position sensors, such as the Melexis US2884 Hall effect sensor contained in each traction motor. The vehicle control unit may sense the speed of each traction motor using a feedback from a hall sensor, and may sense the current through the traction motor phases combined.

Still referring to FIG. 1, in one embodiment, robotic mower 100 may operate in a specified area 102 that is surrounded by main or outer boundary wire 103 which may form a loop positioned at or below the ground or turf surface. Additionally, inner wire 104 may be a shorter loop provided within the area of the main boundary wire where charging station 105 is positioned. The main boundary wire and inner wire may be connected to charging station 105.

In one embodiment, boundary drive circuit 106 may be contained in charging station 105, and may drive signals on the main boundary wire and the inner wire. The fundamental frequency of the waveform on the main boundary wire may be about 2 kHz. The robotic mower may have a boundary wire sensor 119 to detect the waveform and provide a signal to the vehicle control unit to indicate the distance of the sensor to the main boundary wire.

Figure 2:
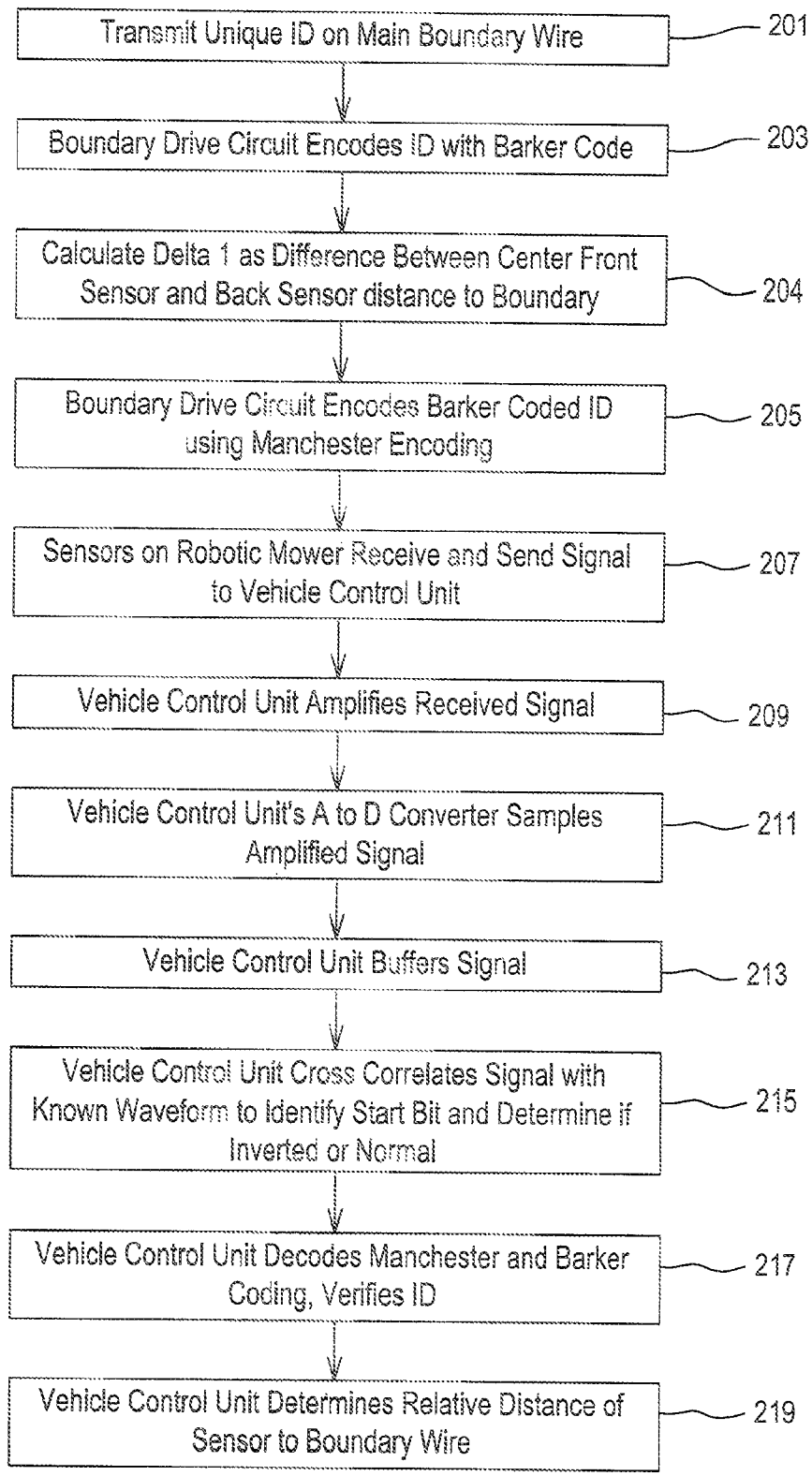
FIG. 2 is a block diagram of a boundary sensing system for a robotic mower according to a preferred embodiment of the invention.

In one embodiment shown in the block diagram of FIG. 2, the charging station may drive the main boundary wire and inner wire from a single h-bridge device. The h-bridge may drive both boundary wires, but only one of the boundary wires at a time, to minimize power requirements and component costs.

In one embodiment, the boundary driving circuit may transmit a unique ID on the main or outer boundary wire loop ten times per second in block 201. In block 203, the boundary driving circuit may encode the ID with a 4 bit Barker code to improve the signal to noise ratio and reduce susceptibility to noise interference. The resulting 1's and 0's are called chips. A process gain of 6 dB may be achieved with four chips, where process gain is the ratio of chip rate to data rate. In block 205, the microprocessor may encode the Barker coded ID using Manchester encoding to ensure there always is a line voltage transition for every bit or chip.

In one embodiment, in block 207, one or more boundary sensors on the robotic mower may receive the encoded boundary wire magnetic signal, and send the signal to the vehicle control unit. In block 209, the vehicle control unit may amplify the received signal. In block 211, the vehicle control unit's analog to digital converter may sample the amplified signal, preferably at a rate of 200 kHz. In block 213, the vehicle control unit may buffer the sample data for further processing. The boundary wire magnetic signal may be very small and similar in amplitude to the background noise if the robotic mower is a significant distance from the main boundary wire loop. This limits the amount of amplification that can be applied to the signal, and it may be difficult to detect the signal using traditional hardware/software methods.

In one embodiment, in block 215, the vehicle control unit may cross correlate the received signal (at the boundary sensor's present position) with a known waveform (at a known distance to the boundary wire) to identify the start bit in the data buffer and determine if the data is inverted, indicating the sensor is outside the main boundary loop, or normal, indicating the sensor is inside the main boundary loop. The peak to peak amplitude of the known waveform may be the theoretical maximum that the boundary sensor and vehicle control unit can receive without distorting the signal. Cross correlation is done by converting the known waveform data and the sampled waveform data from the time domain into the frequency domain. This may be accomplished by running a FFT on the data, multiplying the FFT results together, and then running an inverse FFT on the result of that product.

In block 217, the vehicle control unit may decode the Manchester and Barker coding, and verify the ID against the identification stored in non-volatile memory. In block 219, the vehicle control unit may determine the relative distance of the sensor from the outer boundary wire. The cross correlation function may provide the time lag difference between the known waveform (at a known distance to the boundary wire) and the unknown received sampled waveform (the boundary sensor's distance to the boundary wire). The location in time of the maximum peak value of the lag provides the starting location in time of the transmitted data packet located in the sampled waveform data. The amplitude of the lag is proportional to the difference between the known waveform's maximum amplitude and the received sample data's maximum amplitude. For example, if the known waveform has a maximum peak value of 1.65 volts or 2048 A/D (0.000805 volts per count) counts, and the resulting cross correlation lag value is 360, the peak amplitude of the sampled data is 360*0.00805=0.2898 volts.

In one embodiment, the robotic mower may have one boundary sensor to indicate proximity of the sensor to the wire. FIG. 11 is a schematic diagram of an embodiment of the electronic circuit of a boundary sensor on the robotic mower. The boundary sensor may include a sense coil L1 and a circuit to amplify and filter the signal from the sense coil before it is applied to the ND input of the vehicle control unit. The battery pack on the robotic mower may have a minimum power input voltage of 20V and a maximum power input voltage of 30 v. The vehicle control unit may have a +5V power supply to the boundary sensors, and the vehicle control unit may provide a 2.5V reference to each boundary sensor. The signal range for each sensor may be 0V to 5.25V.

In one embodiment, sense coil L1 may be an inductor that detects the magnetic field generated by the current flowing in the main or outer boundary wire and/or inner boundary wire. For example, sensor coil L1 may be a 100 mH 10% inductor Bournes RL622-104K-RC. The maximum peak voltage of the sense coil L1 may be approximately 75 mV when the sensor is located six inches from the boundary wire.

In one embodiment, the boundary sensor circuit may include a quad op amp with transimpedance amplifier U1-A, band pass filter U1-B, variable gain amplifier U1-C, and comparator U1-D. For example, the quad op amp may be a National Semiconductor LMV6484IMX Op Amp (Quad). A valid signal from the final stage output of the quad op amp may be greater than about 100 mV.

In one embodiment, transimpedance amplifier U1-A may convert the current induced in sense coil L1 into a voltage and amplify that voltage. Resistor R1 may convert the output current from sense coil L1 into a voltage. The output voltage of the transimpedance amplifier may be equal to the input current multiplied by the feedback resistor R1. For example, resistor R1 may be 100 kΩ. Capacitor C1 may provide stability to prevent the transimpedance amplifier from oscillating. Oscillation may be the result of capacitance of the input sensor and the op amp itself. For example, C1 may be a 47 pF 50V 10% COG ceramic capacitor.

In one embodiment, band pass filter U1-B may provide a second order Sallen-Key high pass filter to cancel noise such as low frequency noise from the traction wheel motors of the robotic mower. Capacitors C2 and C3 and resistors R2 and R3 may set the corner or roll off frequency of the filter. For example, R2 and R3 may be 1 Meg Ohm 1/16 W 1% resistors, and C2 and C3 may be 100 pF 50 V 5% COG ceramic capacitors. The output of the high pass filter may be followed by resistor R4 and capacitor C4, which may perform low pass filtering. For example, R4 may be a 10.0 k 1/16 W 1% resistor, and C4 may be a 47 pF 50V 10% COG ceramic capacitor. Capacitor C5 may be a decoupling capacitor with a voltage rating high enough for the maximum voltage on the +5V power supply. For example, C5 may be a 0.1 µF 16V 10% X7R MLC capacitor.

In one embodiment, the quad op amp also may include variable gain amplifier U1-C. Resistors R5 and R6 may set the gain of the variable gain amplifier, and resistor R6 may provide the negative feedback. For example, R5 may be a 10.0 k, 1/16 W, 1% resistor, and R6 may be a 100 kΩ, 1/16 W 1% resistor. Dual diode D1 may automatically reduce the gain when the received signal strength is higher, such as when the robotic mower is very near the boundary wire. If the output voltage of variable gain amplifier U1-C is too high, one of the pair of diodes D1 may conduct and clamp the voltage across resistor R6, reducing the gain. As the input voltage to the amplifier increases, a point will be reached where the diodes conduct. Beyond this point the feedback from the output to the inverting input will be equal to the voltage across the diode. For example, D1 may be an NXP BAV99LT1G high-speed switching dual diode.

In one embodiment, the boundary sensor circuit also may include unity gain buffer U2-A to buffer the output of variable gain amplifier U1-C before connection to the vehicle control unit via a wiring harness. For example, unity gain buffer U2-A may be a National Semiconductor LM771 op amp. Capacitor C7 may be a bypass capacitor for unity gain buffer U2-A. For example, capacitor C7 may be a 0.1 µF 16V 10% X7R MLC capacitor.

In one embodiment, the boundary sensor circuit may include comparator U1-D which may form a Schmitt trigger comparator circuit to provide an output that indicates whether or not the received signal strength is great enough to be considered a valid signal. If the received signal is greater than the threshold, the output of the comparator will be high. Resistors R7 and R8 may form a voltage divider used to set the threshold for a valid signal, indicating a valid signal instead of noise. For example, R8 may be a 5.62 k, 1/16 W 1% resistor, and R7 may be a 200 Ω 1/16 W1% resistor. Resistors R9 and R10 may configure the hysteresis of the comparator, with R10 providing the positive feedback. R9 and R10 together set the upper and lower thresholds of the Schmitt trigger comparator. For example, R9 may be a 5.62 k 1/16 W 1% resistor and R10 may be a 1 Meg Ohm 1/16 W 1% resistor.

In an alternative embodiment, the robotic mower may have a plurality of boundary sensors 119, and most preferably three boundary sensors mounted at or near the front of the robotic mower and a fourth boundary sensor mounted at or near the back of the robotic mower. The vehicle control unit may receive input from each of the boundary sensors regarding strength of the signal from the main boundary wire to indicate proximity of the sensor to the wire.

Figure 3:
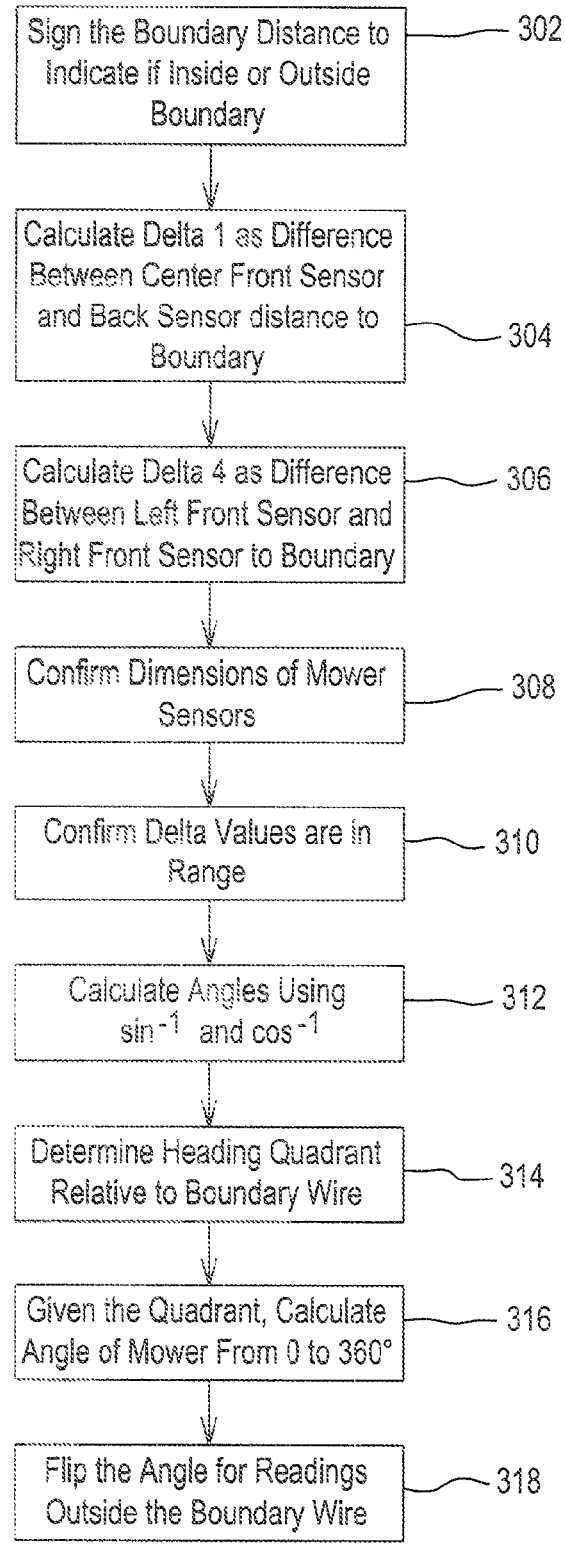
FIG. 3 is a block diagram of an orientation and heading system for a robotic mower that may be used with the boundary sensing system of FIG. 2.

In the alternative embodiment described in FIG. 3, the vehicle control unit may use signals from four boundary sensors to determine orientation and heading of the robotic mower with respect to the boundary wire. In block 302, the vehicle control unit may sign the boundary distance signal from each boundary sensor to indicate if the sensor is inside or outside the main boundary wire. In block 304, the vehicle control unit calculates $\Delta 1$ as the difference between the distance from the center front sensor to the main boundary wire, compared to the distance from the back sensor to the main boundary wire. In block 306, the vehicle control unit calculates $\Delta 4$ as the difference between the left front sensor to the main boundary wire, compared to the distance from the right front sensor to the main boundary wire. In block 308, the vehicle control unit confirms the dimensions between the sensors on the mower based on fixed values stored in memory. For example, these dimensions may include L1 between the front center and back sensors, and L2 between the left and right front sensors. In block 310, the vehicle control unit confirms that the values calculated for $\Delta 1$ and $\Delta 4$ are within the ranges that are possible given the specified dimensions, L1 and L2. In block 312, the vehicle control unit calculates a pair of angles using trigonometric equations with $\Delta 1$, $\Delta 4$, L1 and L2. The angles may be $\theta 1 = \arcsin(\Delta 1/L1)$ and $\theta 2 = \arccos(\Delta 4/L2)$.

In one embodiment, in block 314, the vehicle control unit determines which of the four possible heading quadrants the robotic mower is in relative to the main boundary wire. For example, if $\Delta 1$ is greater than or equal to 0 and $\Delta 4$ is less than or equal to zero, the heading is in quadrant 1. In block 316, the vehicle control unit calculates the heading angle of the robotic mower given the heading quadrant from the preceding step. For example, in quadrant 1, the angle $\theta = 360$ degrees$-\arcsin(\Delta 1/L1) \times 180$ degrees/$\pi$. The angle $\theta$ of the mower will be within the range from 0 degrees to 360 degrees. In block 318, the vehicle control unit may flip the angle for readings outside the main boundary wire.

In one embodiment, the vehicle control unit may select the type of area coverage used by the robotic mower for mowing within the main boundary wire. Using the steps described below in the block diagram of FIG. 4, the vehicle control unit may command the robotic mower to switch from one type of area coverage to another without operator intervention and without discontinuing mowing. The vehicle control unit may select the type of area coverage based on input from one or more boundary sensors 119 regarding distance of the robotic mower to the main boundary wire, current draw of electric blade motor 112 that rotates one or more cutting blades, and the type of area coverage used during a specified preceding time period which may be stored in the vehicle control unit memory.

Figure 4:
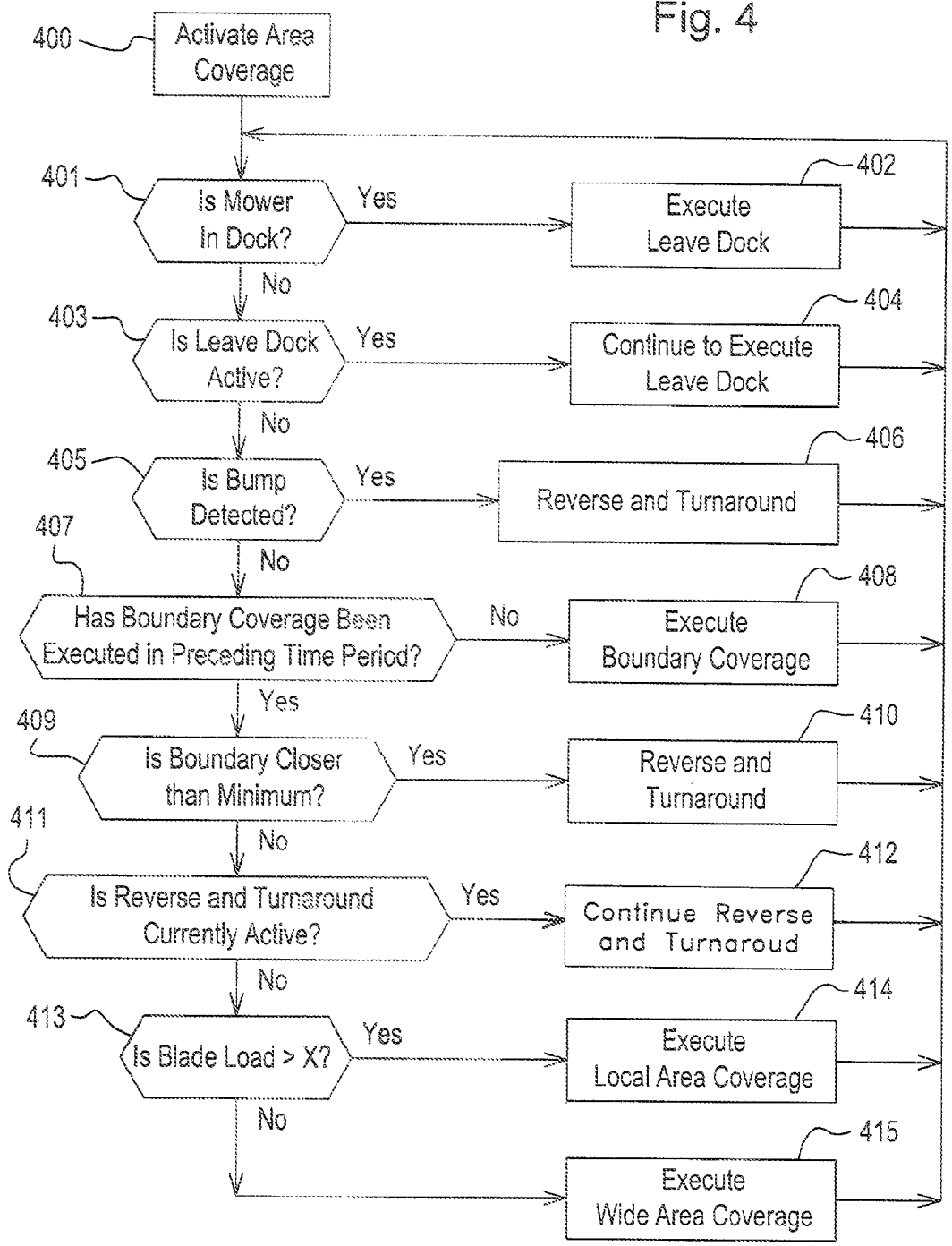
FIG. 4 is a block diagram of an improved area coverage system for a robotic mower according to a first embodiment of the invention.

In one embodiment shown in the block diagram of FIG. 4, in block 400 the robotic mower may be activated to start area coverage, such as by an operator or by an internal or external timer. The vehicle control unit then may run the routine described in the block diagram about every 40 milliseconds. In block 401 the vehicle control unit may determine if the robotic mower is in the charging station, preferably by checking if the voltage on the charger contacts is within a specified range. If the robotic mower is in the charging station, in block 402 the vehicle control unit may command the traction wheel motors to leave the charging station by rotating in reverse for a specified distance or duration to back up the robotic mower out and away from the charging station, then turn the robotic mower around. The vehicle control unit may determine how much each wheel motor has rotated based on pulse feedback from the Hall effect sensor in each motor. If the vehicle control unit determines the robotic mower is not in the charging station, in block 403 the vehicle control unit may determine if the leave dock instruction is still active. If the leave dock instruction is still active, in block 404 the vehicle control unit may command the wheel motors of the robotic mower to continue executing the leave dock instruction.

In one embodiment, in block 405 the vehicle control unit may determine if a bump is detected, indicating the robotic mower has contacted an obstacle. Bump detection may be provided to the vehicle control unit by one or more accelerometers attached to the chassis and/or top cover of the robotic mower. The accelerometer may be a three axis accelerometer such as the ST LIS302DL which also may be used to sense lifting and orientation, and may communicate to the microcontroller with a SPI bus at the voltage logic level of the microcontroller. If the accelerometer indicates an obstacle is bumped, in block 406 the vehicle control unit may command both traction motors to reverse direction for a specified distance or duration and then turn the robotic mower around.

In one embodiment, if no bump is detected, in block 407 the vehicle control unit may determine if a specified coverage such as boundary coverage was executed within a specified preceding time period such as seven days. The vehicle control unit memory may store data on the type of coverage executed for a specified preceding time period. If boundary coverage was not executed during the specified preceding time period, in block 408 the vehicle control unit may command the traction motors to execute boundary coverage. Preferred boundary coverages are described below.

In one embodiment, if the specified boundary coverage was executed within the preceding time period specified in block 407, in block 409 the vehicle control unit may determine if the robotic mower is closer to the boundary or perimeter wire than a specified distance, using input from one or more boundary sensors 119. If the robotic mower is closer than the specified distance, in block 410 the vehicle control unit may command the traction motors to reverse direction for a specified duration and then turn the robotic mower around.

In one embodiment, if the robotic mower is not closer than the specified distance to the boundary wire, in block 411 the vehicle control unit may determine if the wheel motors are currently executing the reverse and turn around function. If the motors are still in reverse for the prespecified distance or duration, or have not finished turning the robotic mower around, in block 412 the vehicle control unit may command both traction wheel motors to continue the reverse and turn around functions.

In one embodiment, if the vehicle control unit determines the reverse and turn around function is currently active, in block 413 the vehicle control unit may determine if the blade load is greater than a first predetermined specified value X which indicates uncut grass. Higher current means higher blade load and torque, indicating longer, uncut grass. Lower current, lower blade load and torque, indicates shorter, cut grass. If the blade load is greater than the first value, in block 414 the vehicle control unit may command the traction wheel motors to execute local area coverage. A preferred local area coverage is described below.

In one embodiment, if the blade load is not greater than the predetermined specified value X, in block 415 the vehicle control unit commands the traction wheel motors traction motors to execute wide area coverage. A preferred wide area coverage is described below.

In one embodiment, the vehicle control unit may execute wide area coverage by commanding the left and right wheel motors to drive the robotic mower in a straight line until an obstacle or boundary wire is encountered. When the robotic mower encounters the boundary wire or obstacle, the vehicle control unit may command the wheel motors to reverse and back up the mower for a prespecified distance and then turn the robotic mower around, preferably less than 180 degrees, to follow a path that diverges from the preceding forward path. Alternatively, the vehicle control unit may specify and execute other methods of wide area coverage, including but not limited to traveling in arcs instead of straight lines.

Figure 5:
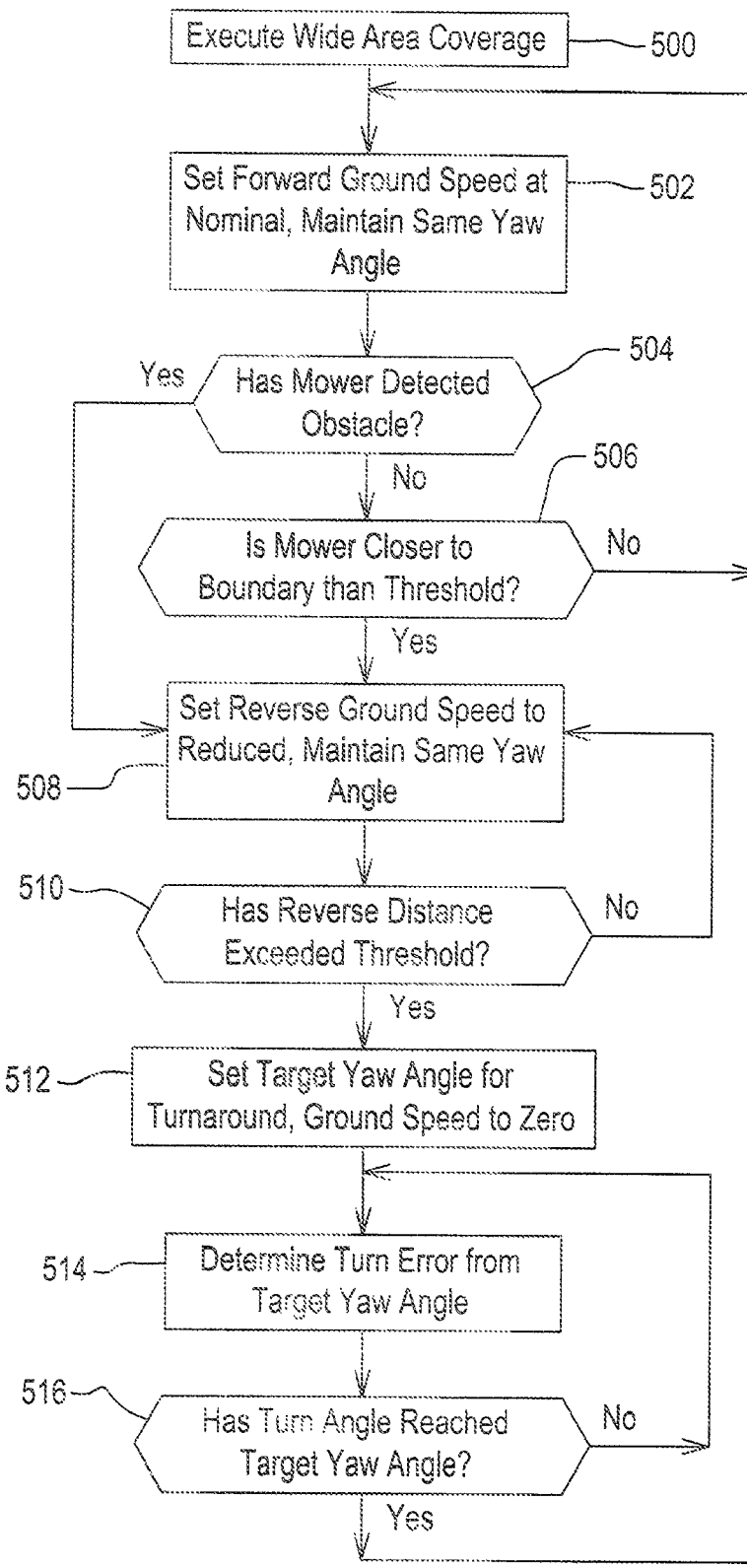
FIG. 5 is block diagram of an embodiment of a wide area coverage that may be used with the improved area coverage system of FIG. 4.

In a preferred embodiment shown in the block diagram of FIG. 5, wide area coverage may begin executing in block 500. In block 502, the vehicle control unit may set the forward ground speed of the traction wheel motors at a nominal speed, and to maintain the same yaw or steering angle (i.e., 0 degrees for a straight path) so that the robotic mower travels in a straight line.

In one embodiment, in block 504 the vehicle control unit determines if the robotic mower has bumped an obstacle, as indicated by one or more accelerometers, for example. If the robotic mower has detected an obstacle, in block 508 the vehicle control unit may command both traction wheel motors to rotate in reverse to back up at a reduced ground speed, and to maintain the same yaw angle. If the robotic mower has not bumped an obstacle in block 504, the vehicle control unit may determine if one or more boundary sensors indicate the mower is closer to the main boundary wire than a prespecified threshold distance. If one or more boundary sensors indicate the robotic mower is not close to the main boundary wire, the vehicle control unit commands the left and right wheel motors to continue rotating forward as indicated in block 502. If the boundary sensor(s) indicate the robotic mower is close to the main boundary wire, in block 508 the vehicle control unit may command the wheel motors to rotate in reverse at a reduced ground speed, and to maintain the same yaw angle. In block 510, the vehicle control unit may determine if the traction wheel motors have rotated in reverse a prespecified or threshold time or distance. If the traction wheel motors have not rotated the prespecified time or distance in reverse, the vehicle control unit may command the motors to continue in reverse as indicated in block 510.

In one embodiment, once the traction wheel motors have rotated for the threshold distance or time in reverse, in block 512 the vehicle control unit may set a target yaw angle at a prespecified angle, preferably less than 180 degrees, and command the left and right wheel motors to turn the robotic mower around at a ground speed of zero. In block 514, the vehicle control unit determines the turn error from the target yaw angle. In block 516, once the turn angle reaches the target yaw angle, the vehicle control unit may command the traction wheel motors to rotate in forward again at a nominal speed and maintain the same yaw angle (i.e., 0 degrees), as specified in block 502. If the turn angle has not reached the target yaw angle yet, the vehicle control unit will command the traction wheel motors to continuer turning the robotic mower around, and then calculate the turn error again in block 514.

Figure 6:
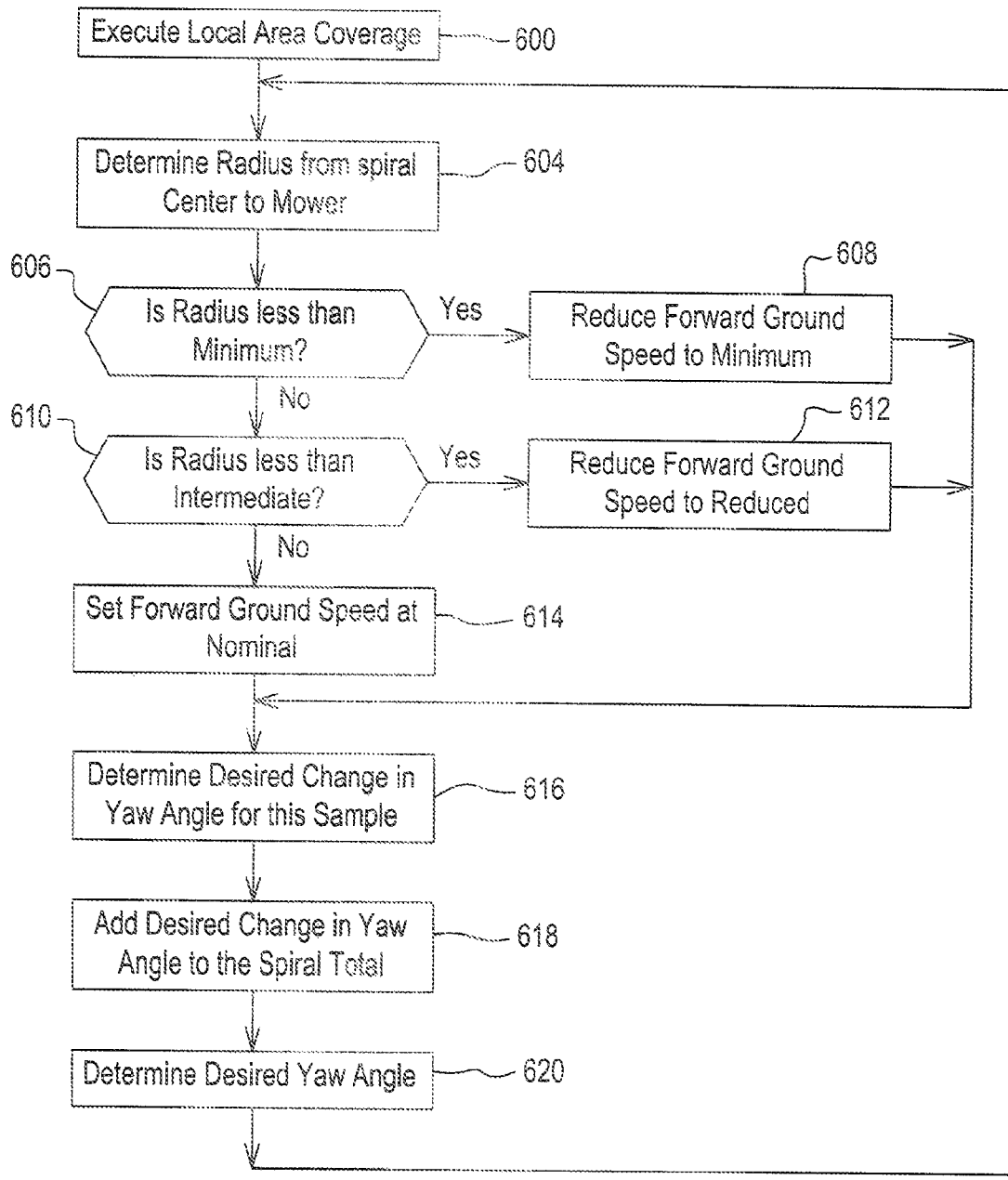
FIG. 6 is a block diagram of an embodiment of a local area coverage that may be used with the improved area coverage system of FIG. 4.

In one embodiment, local area coverage may be a path that spirals outwardly, either clockwise or counterclockwise, from the robotic mower's initial position. Alternatives for local area coverage may include other patterns starting from an initial position of the robotic mower. As shown in the block diagram of FIG. 6, in block 600 the vehicle control unit begins executing local area coverage. In block 604, the vehicle control unit may determine the radius from the spiral center, where local area coverage began, to the current location of the robotic mower. When local area coverage begins the radius value is zero, and may be incremented based on the difference in radius between sequential passes of the robotic mower around the spiral. Thus, the radius value is a function of how many degrees the robotic mower has traveled around the spiral, and the spacing of the spiral based on the robotic mower's effective cutting width. In block 606, the vehicle control unit may determine if the radius is less than a prespecified minimum value. If it is less than the minimum value, in block 608 the vehicle control unit may command the traction wheel motors to rotate at a minimum forward ground speed. In block 610, the vehicle control unit may determine if the radius is less than an intermediate value. If the radius is less than the intermediate value, in block 612 the vehicle control unit may command the traction wheel motors to rotate at a reduced forward ground speed, which may be greater than the minimum speed. In block 614, the vehicle control unit may command the traction wheel motors to rotate at a nominal forward ground speed, which may be higher than the reduced speed, if the radius is at least the intermediate value. In block 616, the vehicle control unit determines the desired change in yaw angle for the sample, which may be a function of the time period between function calls, the ground speed, and the radius. In block 618, the vehicle control unit may add the desired change in yaw angle to the spiral total. In block 620, the vehicle control unit may determine the desired yaw angle for the robotic mower, which may be based on the current yaw angle plus the desired change in yaw angle.

Figure 7:
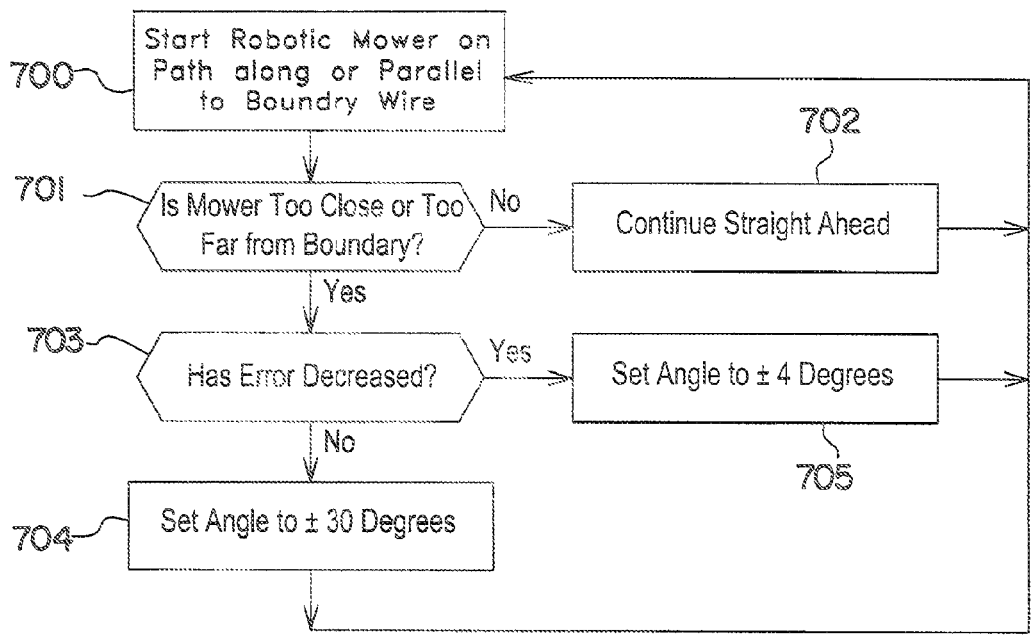
FIG. 7 is a block diagram of an embodiment of a boundary following system that may be used according to one embodiment of the invention.

In one embodiment, the robotic mower may execute boundary coverage, or return to the charging station, on a path along or parallel to the boundary wire using the system described in the block diagram of FIG. 7. The vehicle control unit may use this system based on input from one boundary sensor on the robotic mower regarding strength of the signal from the main boundary wire to indicate proximity of the sensor to the wire. The vehicle control unit may use input from the boundary sensor to direct the traction wheel motors to follow a path along or at a specified distance parallel to the boundary wire.

As shown in FIG. 7, in block 700, the vehicle control unit may command the left and right traction motors to start rotating in forward on a path at a specified distance parallel to the boundary wire. In block 701, the vehicle control unit compares the input from the boundary sensor to the specified distance, to decide if the robotic mower is too close or too far from the boundary wire. If the boundary sensor indicates it is within the specified distance to the boundary wire, in block 702 the vehicle control unit commands the left and right wheel traction drive motors to continue rotating straight ahead. If the boundary sensor indicates it is too close or too far from the boundary wire, in block 703 the vehicle control unit determines if the error or deviation from the specified distance has decreased, by comparing the boundary sensor input to one or more previous boundary sensor inputs, preferably spanning a time period of at least about one second. If the error has not decreased, in block 704 the vehicle control unit commands the left and right wheel motors to turn the vehicle at a larger acute angle (such as 30 degrees) away from or back toward the boundary wire, depending on whether the robotic mower is too close or too far from the boundary wire. If the error has decreased, in block 705, the vehicle control unit commands the left and right wheel motors to turn the vehicle at a reduced acute angle (such as 4 degrees) away from or back toward the boundary wire, depending on whether the boundary sensor is too close or too far from the boundary wire.

In an alternative embodiment, the vehicle control unit may command the robotic mower to execute boundary coverage using one or more patterns along the boundary or perimeter wire. This boundary coverage may use a pattern that minimizes turf damage or rutting along the boundary due to repetitive wear from the robotic mower's traction drive wheels and caster wheels. For example, boundary coverage may use variable traffic patterns such as a zig-zag pattern to shift the wheel tracks each time the robotic mower executes boundary coverage along the boundary or perimeter wire. Other alternatives also may be specified by the robotic mower controller for boundary coverage, including but not limited to sine or square wave patterns along the boundary or perimeter wire.

Figure 8:
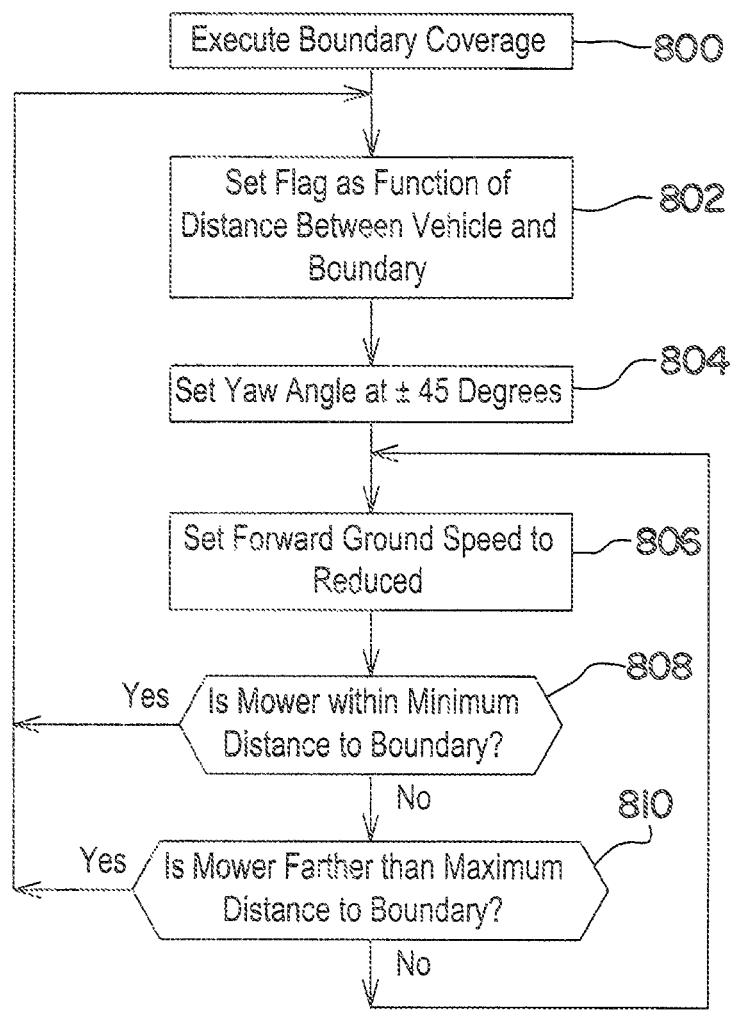
FIG. 8 is a block diagram of a boundary following system that may be used according to an alternative embodiment of the invention.

In one embodiment, the vehicle control unit may use information received from one or more boundary sensors regarding the distance of the robotic mower to the boundary wire, to alternate the robotic mower's path between driving toward and away from the boundary wire at a specified angle. For example, as shown in FIG. 8, the vehicle control unit may execute boundary coverage beginning in block 800. In block 802, the vehicle control unit may set a flag as a function of the distance between the boundary sensor and the boundary wire. For example, the flag may be set at 0 if the boundary sensor indicates it is within a threshold distance to the boundary wire, or 1 if it is further than the threshold distance. In block 804, the vehicle control unit may specify the yaw angle of the robotic mower in relation to the main boundary wire at either plus 45 degrees or minus 45 degrees, depending on the flag setting. In block 806, the vehicle control unit may command the left and right wheel motors to move the robotic mower forward at a reduced forward ground speed. In block 808, the vehicle control unit may determine if the robotic mower is within a minimum distance to the boundary wire. If the robotic mower is within the minimum distance, the vehicle control unit may reset the flag in block 802. If not, the vehicle control unit may determine if the robotic mower is farther than a maximum distance from the boundary wire. If the robotic mower is further than the maximum distance, the vehicle control unit may reset the flag in block 802. Otherwise, the vehicle control unit may command the wheel motors to continue rotating forward at the reduced speed, as shown in block 806. Thus, the vehicle control unit may command the traction motors to toggle back and forth between plus 45 and minus 45 degrees as a function of the robotic mower's distance to the perimeter wire.

In one embodiment, the robotic mower's path along the boundary wire may change or shift each time it executes boundary coverage. The shift ensures that the same turf is not repeatedly contacted and compacted by the robotic mower's wheels. The shift may occur because the robotic mower will often have a different starting position each time it starts executing boundary coverage. Additionally, a shift may result from changing the boundary coverage pattern by including variables in the vehicle control unit logic such as the minimum and maximum distances used to toggle the desired orientation, or using a different angle other than 45 degrees.

In one embodiment, the vehicle control unit may vary the distance of the robotic mower's path when the robotic mower executes home finding to return to the charging station. The vehicle control unit may specify a return path that is offset from the main boundary wire, and varies over a range of available paths between a minimum offset and a maximum offset. By varying the offset from the main boundary wire, the traction drive wheels of the robotic mower will not wear or damage the turf along the wire. The minimum and maximum allowable offset from the main boundary wire may be preselected or constant. Alternatively, the offset may be incremented or reduced each time the robotic mower returns to the charging station.

Figure 9:
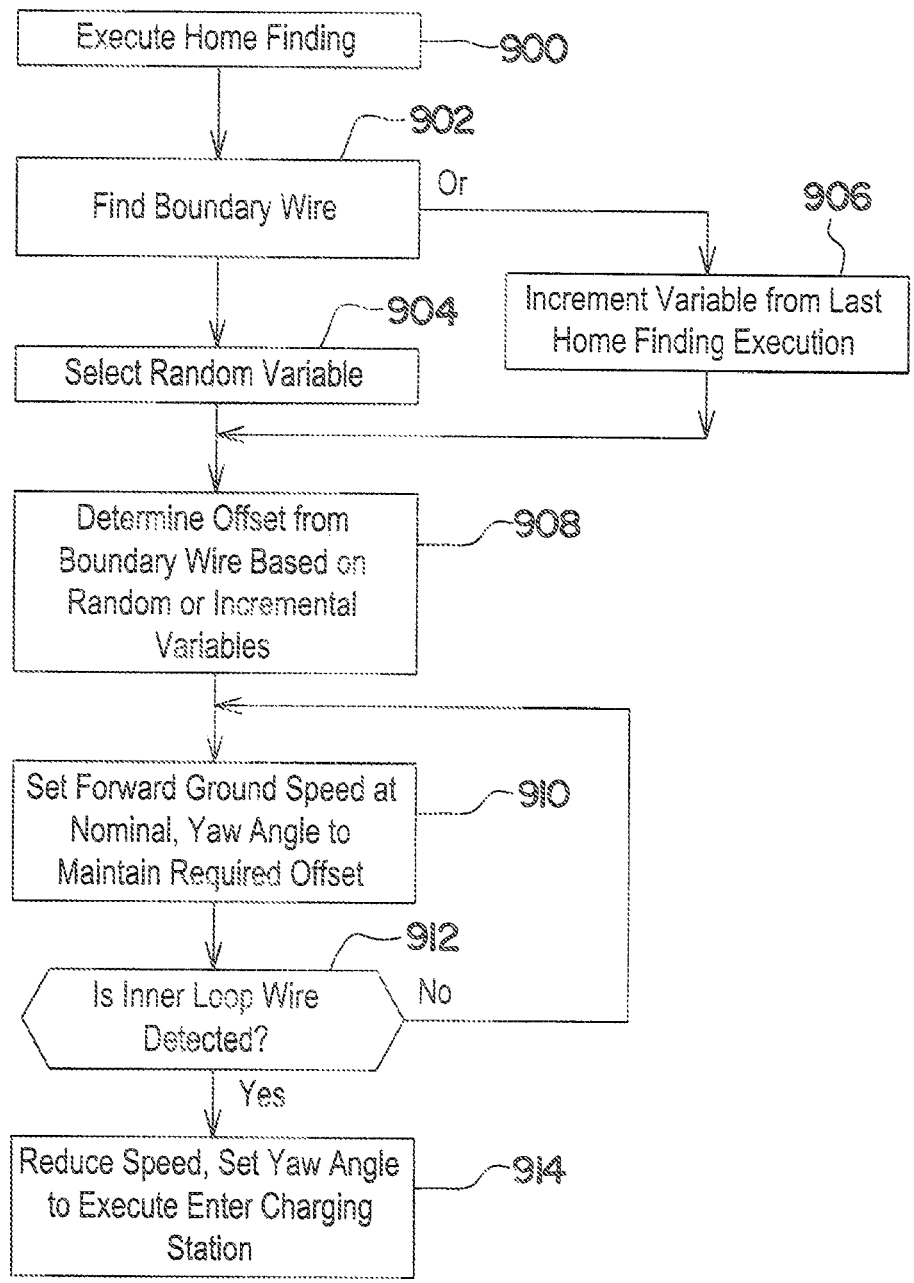
FIG. 9 is a block diagram of a boundary following system for a robotic mower with a single according to another alternative embodiment of the invention.

In one embodiment, as shown in FIG. 9, the vehicle control unit may execute home finding in block 900. In block 902, the vehicle control unit may find the main boundary wire using one or more boundary sensors. In block 904, the vehicle control unit may select a random variable. Alternatively, in block 906 the vehicle control unit may increment a variable from the last execution of the home finding task. In block 908, the vehicle control unit may determine the desired offset from the boundary wire based on the random or incremented variable. In block 910, the vehicle control unit may command the wheel motors to rotate at the nominal forward speed, and at a yaw angle needed to maintain the desired offset. In block 912, the vehicle control unit determines if the inner loop wire is detected by the boundary sensors. If the inner loop wire is not detected, the vehicle control unit may continue commanding the wheel motors to rotate forward as shown in block 910. If the inner loop wire is detected, the vehicle control unit commands the wheel motors to reduce speed, and sets the yaw angle to orient the robotic mower to enter the charging station.

In one embodiment, the vehicle control unit memory may record and store the time when an obstacle or boundary wire has been last detected, and may determine the robotic mower is stuck if a prespecified amount of time elapses before the robotic mower encounters an obstacle or boundary wire again. Preferably, an accelerometer or similar device may be used to detect obstacles, and one or more boundary sensors may be used to detected the boundary wire. The timer duration may be prespecified by the operator or as a function of the size of the area to be mowed, obstacle density, vehicle speed and navigation rules. Additionally, the timer duration may be a function of the type of area coverage being executed by the robotic mower.

In one embodiment, the timer duration may be the product of the expected maximum distance between obstacles or boundaries, and the robotic mower's expected travel speed. The timer duration may be relatively short during boundary coverage because the vehicle control unit expects to encounter the boundary again after traveling only a short distance. The timer duration for wide area coverage may be determined from the maximum span between opposite boundaries if the robotic mower travels in a straight line.

Figure 10:
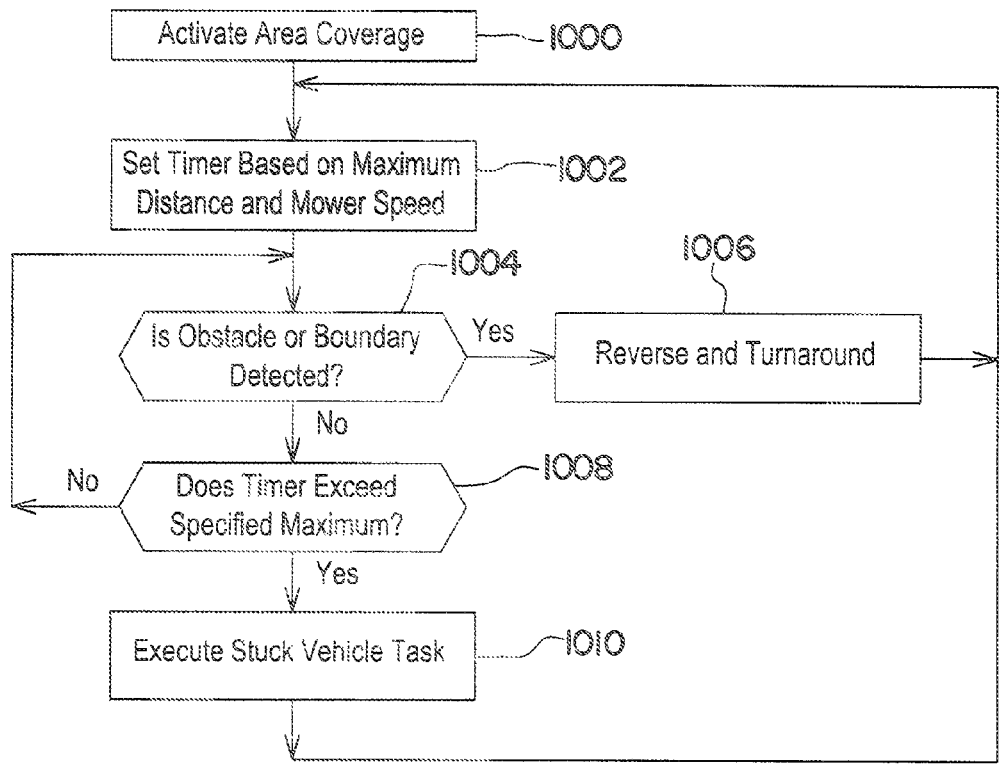
FIG. 10 is a block diagram of a stuck detection system for a robotic mower according to a preferred embodiment of the invention.

In one embodiment, as shown in FIG. 10, the vehicle control unit may execute stuck detection in block 1000. In block 1002, the vehicle control unit may set a timer based on maximum distance and mower speed. In block 1004, the vehicle control unit may determine if an obstacle or boundary wire is detected by an accelerometer or boundary sensor. If an obstacle or boundary wire is detected, in block 1006 the vehicle control unit may command the robotic mower to reverse and turn around, and then reset the timer again in block 1002. If an obstacle or boundary wire is not detected, in block 1008 the vehicle control unit may determine if the timer exceeds a specified maximum time. If the timer does not exceed the specified maximum, the vehicle control unit may resume checking if an obstacle or boundary wire is detected in block 1004. If the specified maximum time is exceeded, in block 1010 the vehicle control unit may execute a stuck vehicle task to safely move or stop the robotic mower.

Having described the preferred embodiment, it will become apparent that various modifications can be made without departing from the scope of the invention as defined in the accompanying claims.

The invention claimed is:

1. A robotic mower area coverage system, comprising: a load sensor on the robotic mower signaling a load on a cutting blade motor; a boundary sensor on the robotic mower indicating the distance from the boundary sensor to a boundary wire;
a vehicle control unit on the robotic mower with memory storing data on at least one boundary or area coverage type executed by the robotic mower within a specified preceding time period;
the vehicle control unit providing commands to a pair of wheel motors to drive the robotic mower to provide a selected type of area coverage from a plurality of types of area coverages based on an input signal from the load sensor and determining if the input signal exceeds a predetermined value for uncut grass, wherein the value for uncut grass is determined by grass height, an input from the boundary sensor indicating the distance to the boundary wire, and an input from the memory indicating the coverage type used in a preceding time period, the coverage types including a wide area coverage constituting traveling in a straight line or arc and turning around at a specified angle when an obstacle or the boundary wire is encountered; a local area coverage constituting traveling in an outwardly expanding pattern from an initial position; and a boundary coverage constituting traveling at a specified distance parallel to the boundary wire each area coverage having a different set of steering angles and wheel motor speeds, and changing the commands between the plurality of types of area coverage without discontinuing mowing or mapping the area.

2. The robotic mower area coverage system of claim 1 wherein the load sensor senses current in the cutting blade motor.

3. The robotic mower area coverage system of claim 1 wherein the local area coverage is a spiral path pattern.

4. A robotic mower area coverage system, comprising: a vehicle control unit commanding a pair of wheel motors on a robotic mower to execute a wide area coverage in a straight path and turn around when the robotic mower reaches a boundary wire, to execute local area coverage in a spiral pattern, or to execute boundary coverage along a boundary wire; the vehicle control unit changing the commanded coverage while continuing to mow, each coverage including a plurality of steering angle commands for directing the robotic mower in the path or pattern or along the boundary wire, and wheel motor speeds for the pair of wheel motors while the robotic mower is away from the boundary wire without mapping the robotic mower's position within the boundary wire, by comparing an input signal from a load sensor on a cutting blade motor to a predetermined value for uncut grass, wherein the value for uncut grass is determined by grass height, comparing an input signal from a boundary wire sensor indicating the distance to the boundary wire to a minimum distance, and accessing a memory that stores data on each type of coverage used during a specified preceding time period.

5. The robotic mower area coverage system of claim 4 wherein the boundary wire sensor provides signals regarding the distance of the robotic mower to the boundary wire.

6. The robotic mower area coverage system of claim 4 wherein the vehicle control unit selects boundary coverage if boundary coverage has not been executed during a specified preceding time period.

7. The robotic mower area coverage system of claim 4 wherein the vehicle control unit selects local area coverage if the load on the cutting blade motor exceeds a specified load.

8. A robotic mower area coverage system, comprising:
a vehicle control unit commanding a pair of wheel motors of a robotic mower traction drive system to switch between a wide area coverage, a local area coverage and a boundary coverage, a wide area coverage constituting traveling in a straight line or arc and turning around at a specified angle when an obstacle or the boundary wire is encountered; a local area coverage constituting traveling in an outwardly expanding pattern from an initial position; and a boundary coverage constituting traveling at a specified distance parallel to the boundary wire, each area coverage including a different set of steering angles and wheel motor speeds, without mapping the position of the robotic mower within the boundary and based only on signals from a boundary wire sensor, a load sensor, and a memory: the vehicle control unit selecting the area coverage by determining if the boundary wire sensor signal indicating the distance to the boundary is within a specified distance, if the load sensor signal exceeds a predetermined value for uncut grass, wherein the value for uncut grass is determined by grass height, and if the memory indicates an area coverage was used during a specified preceding time period, and commanding the pair of wheel motors of the traction drive system to change from one selected area coverage to another selected area coverage while continuing to mow.

9. The robotic mower area coverage system of claim 8 wherein the boundary wire sensor generates signals indicating the distance to an outer boundary wire.

10. The robotic mower area coverage system of claim 8, wherein the load sensor indicates the load on a cutting blade motor.

* * * * *